United States Patent
Rupavatharam et al.

(10) Patent No.: US 11,245,668 B1
(45) Date of Patent: Feb. 8, 2022

(54) CRITICAL FIREWALL FUNCTIONALITY MANAGEMENT

(71) Applicant: Juniper Networks, Inc., Sunnyvale, CA (US)

(72) Inventors: Sreekanth Rupavatharam, Campbell, CA (US); Prashant Singh, Santa Clara, CA (US); Erin C. MacNeil, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 294 days.

(21) Appl. No.: 16/294,491

(22) Filed: Mar. 6, 2019

(51) Int. Cl.
*H04L 29/06* (2006.01)

(52) U.S. Cl.
CPC ............................. *H04L 63/0263* (2013.01)

(58) Field of Classification Search
CPC ............... H04L 63/0263; H04L 63/029; H04L 65/1069; H04L 41/0893; H04L 63/1425; H04L 41/0668; H04L 12/2854; H04L 12/2801; H04L 47/125
See application file for complete search history.

(56) References Cited

U.S. PATENT DOCUMENTS

| | | | | |
|---|---|---|---|---|
| 2004/0268150 A1* | 12/2004 | Aaron | ................ | H04L 63/0263 726/11 |
| 2006/0104288 A1* | 5/2006 | Yim | ........................ | H04L 69/16 370/395.52 |
| 2007/0150582 A1* | 6/2007 | Aaron | ................ | H04L 67/1057 709/224 |
| 2008/0077705 A1* | 3/2008 | Li | ........................... | H04L 69/22 709/236 |
| 2008/0148384 A1* | 6/2008 | Adhikari | ............. | H04L 63/0263 726/13 |
| 2011/0314547 A1* | 12/2011 | Yoo | ........................ | G06F 21/55 726/24 |
| 2014/0282816 A1* | 9/2014 | Xie | ..................... | H04L 63/0227 726/1 |
| 2014/0379673 A1* | 12/2014 | Lim | .................... | G06F 11/3006 707/694 |
| 2015/0172153 A1 | 6/2015 | Sharma et al. | | |
| 2016/0080321 A1* | 3/2016 | Pan | ..................... | H04L 63/0209 726/11 |

(Continued)

OTHER PUBLICATIONS

Ayuso et al., "Communicating between the kernel and user-space in Linux using Netlink sockets", https://pdfs.semanticscholar.org/6efd/e161a2582ba5846e4b8fea5a53bc305a64f3.pdf, 2010, 17 pages.

(Continued)

*Primary Examiner* — Abu S Sholeman
(74) *Attorney, Agent, or Firm* — Harrity & Harrity, LLP

(57) ABSTRACT

A network device may detect, from an application associated with a user space of the network device, a request to configure a firewall provided by a kernel of the network device with a rule. The network device may intercept the request to configure the firewall before the firewall is configured with the rule. The network device, based on intercepting the request to configure the firewall, may analyze the rule to determine whether the rule modifies a critical functionality of the firewall. The network device may reject the request to configure the firewall based on determining that the rule modifies the critical functionality of the firewall.

20 Claims, 8 Drawing Sheets

(56) References Cited

U.S. PATENT DOCUMENTS

| | | |
|---|---|---|
| 2016/0191521 A1 | 6/2016 | Feroz et al. |
| 2017/0235965 A1* | 8/2017 | Balinsky ............... G06F 21/604 726/1 |
| 2018/0007178 A1 | 1/2018 | Subhraveti |
| 2018/0176074 A1* | 6/2018 | Krishnamurthy ..... H04L 47/125 |

OTHER PUBLICATIONS

Rosen, "Linux Kernel Networking", http://www.haifux.org/lectures/172/netLec.pdf, 2007, 88 pages.

* cited by examiner

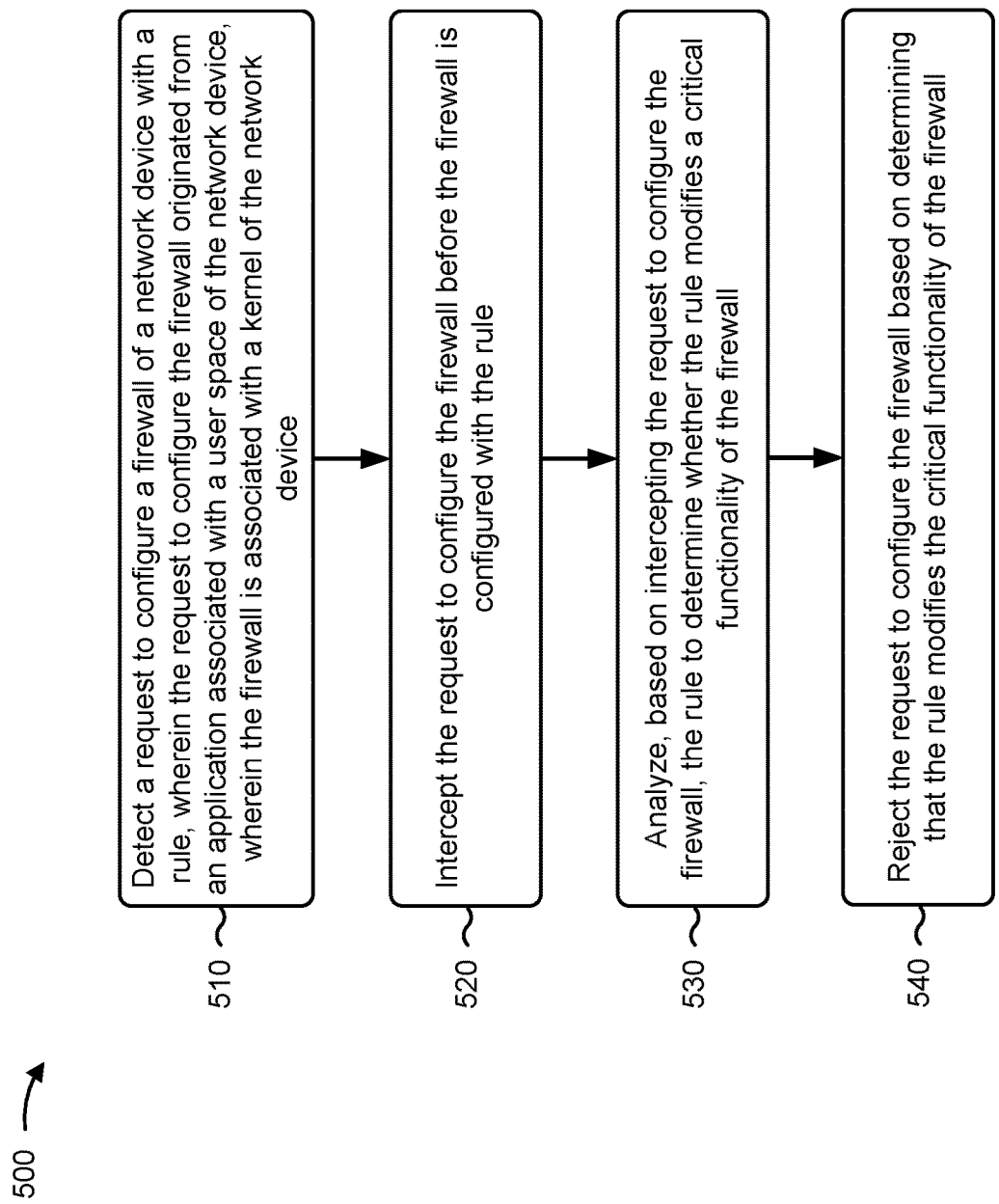

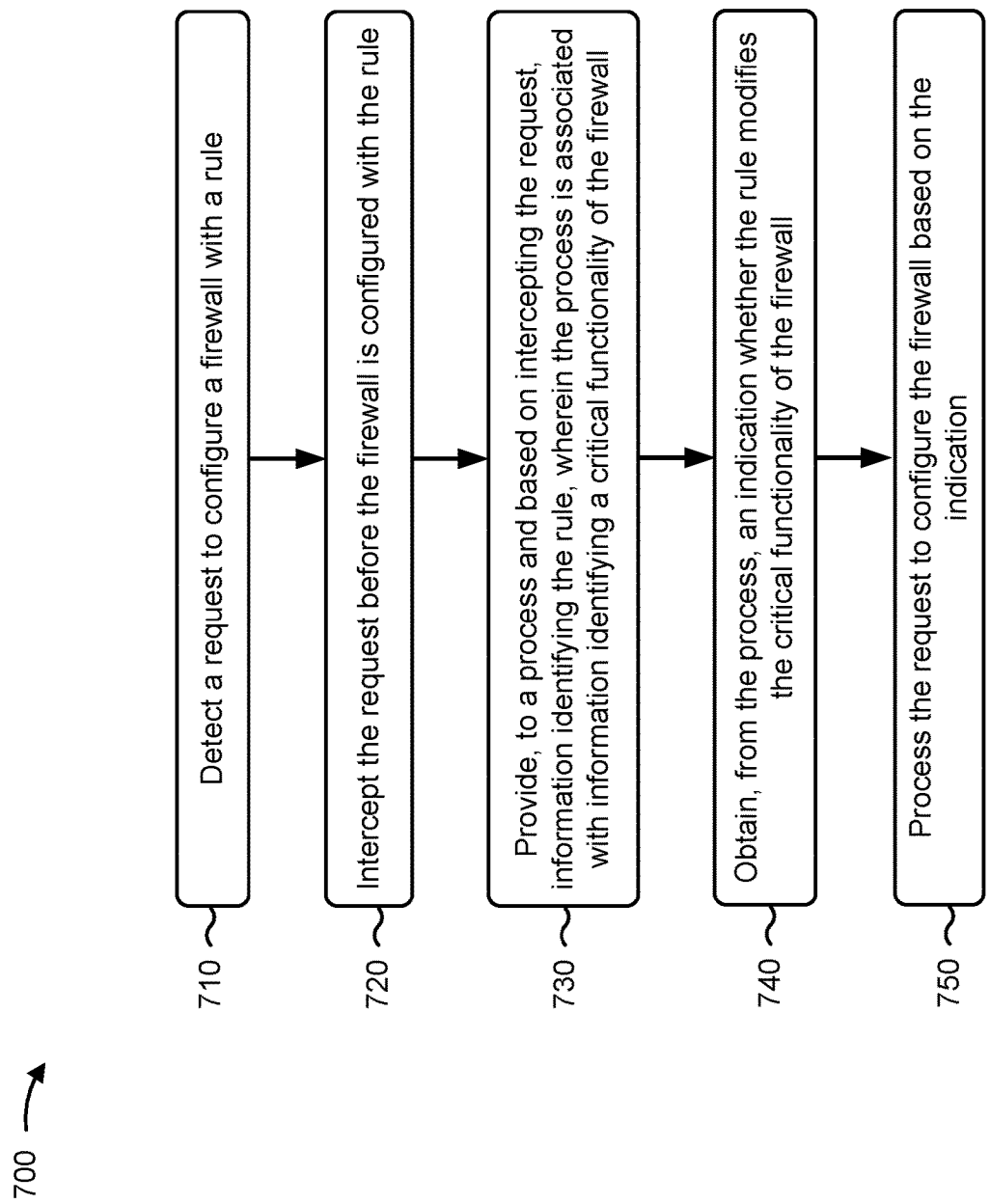

CRITICAL FIREWALL FUNCTIONALITY MANAGEMENT

BACKGROUND

A firewall framework (e.g., a Netfilter framework) may be provided by a kernel (e.g., a Linux kernel) to permit various networking-related operations for packet filtering, network address translation, and port translation. The firewall framework provides the functionality for directing packets through a network. The firewall framework may represent a set of hooks inside the kernel that allows specific kernel modules to register callback functions with a networking stack of the kernel. Those functions, usually applied to the traffic in the form of filtering and modification rules, are called for every packet that traverses the respective hook within the networking stack.

SUMMARY

According to some implementations, a method may include detecting, by a network device, a request to configure a firewall of the network device with a rule, wherein the request to configure the firewall originated from an application associated with a user space of the network device, and wherein the firewall is associated with a kernel of the network device. The method may include intercepting, by the network device, the request to configure the firewall before the firewall is configured with the rule, and analyzing, by the network device and based on intercepting the request to configure the firewall, the rule to determine whether the rule modifies a critical functionality of the firewall. The method may include rejecting, by the network device, the request to configure the firewall based on determining that the rule modifies the critical functionality of the firewall.

According to some implementations, a network device may include one or more memories and one or more processors to intercept a request to configure a firewall of the network device with a rule, wherein the request to configure the firewall originated from an application associated with a user space of the network device, and wherein the firewall is associated with a kernel of the network device. The one or more processors may direct, based on intercepting the request, the rule of the request to a process on the network device, wherein the process is associated with information identifying a particular functionality of the firewall. The one or more processors may analyze, using the process, the rule to determine whether the rule modifies the particular functionality of the firewall, and reject the request to configure the firewall based on determining that the rule modifies the particular functionality of the firewall.

According to some implementations, a non-transitory computer-readable medium may store instructions that include one or more instructions that, when executed by one or more processors, may cause the one or more processors to detect a request to configure a firewall with a rule and intercept the request before the firewall is configured with the rule. The one or more instructions may cause the one or more processors to provide, to a process to be executed by the one or more processors and based on intercepting the request, information identifying the rule, wherein the process is associated with information identifying a critical functionality of the firewall. The one or more instructions may cause the one or more processors to obtain, from the process, an indication whether the rule modifies the critical functionality of the firewall and process the request to configure the firewall based on the indication.

BRIEF DESCRIPTION OF THE DRAWINGS

FIGS. 5-7 are flow charts of example processes for critical firewall functionality management.

DETAILED DESCRIPTION

Figure 1:
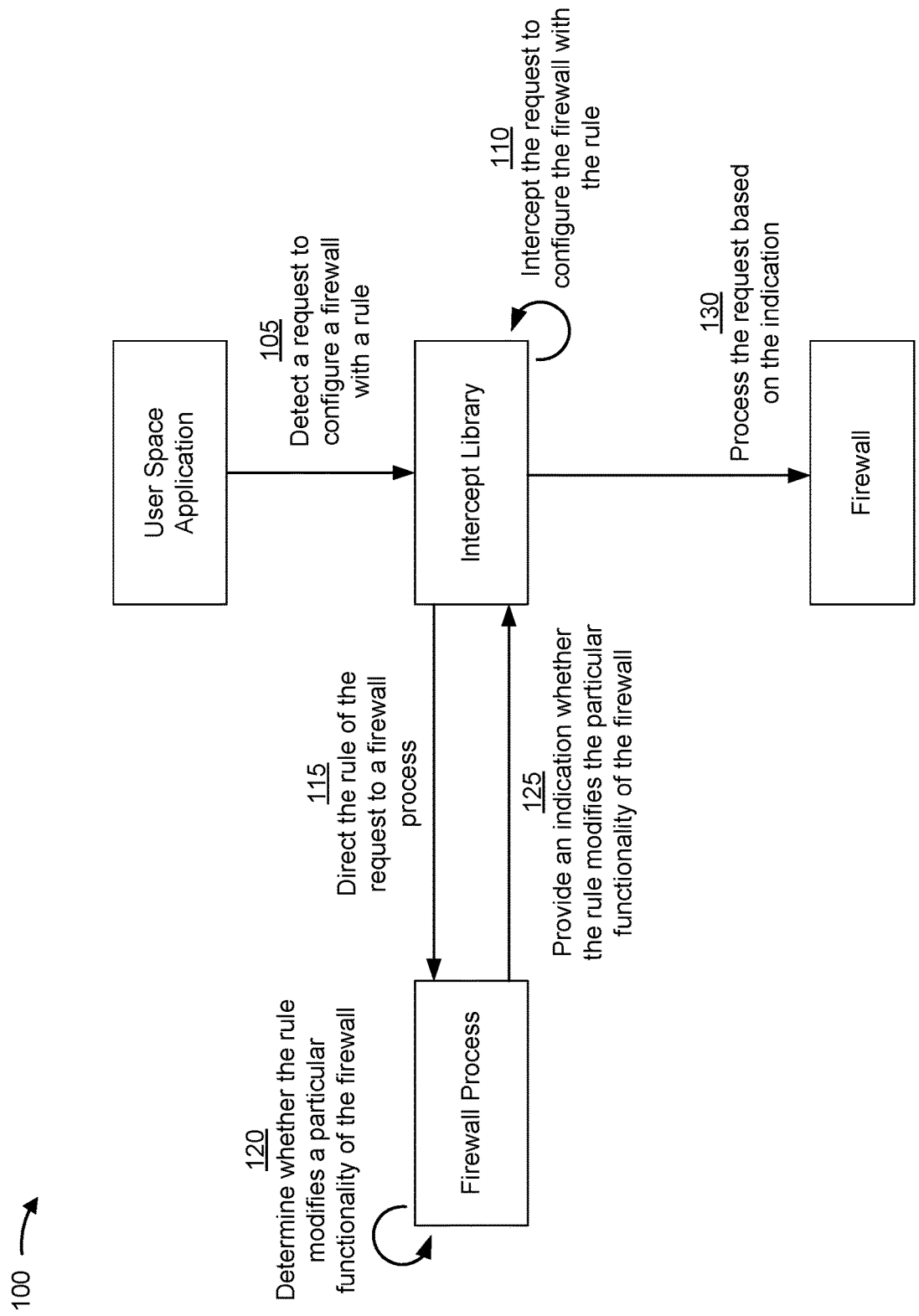
FIG. 1 is a diagram of an example implementation described herein.

The following detailed description of example implementations refers to the accompanying drawings. The same reference numbers in different drawings may identify the same or similar elements.

A firewall provided by a kernel of a network device may be configured by an administrator of a network or a manufacturer of the network device with rules for directing traffic through the network. Such rules may be critical to a particular functionality of the firewall. A user space application of the network device, such as a third-party application executing on the network device, also may configure the firewall of the network device with rules.

In some cases, the application of the user space may transmit a request to configure the firewall with a rule that modifies a particular functionality of the firewall. For example, a system user associated with the network device may, intentionally or unintentionally, initiate a request to configure the firewall with a rule that modifies the particular functionality of the firewall. As a consequence, malicious traffic may be permitted to reach locations within the network, which can result in diverted computing resources (e.g., processing resources, memory resources, and/or the like) and network congestion (e.g., where a device of the network is infected with software that causes the device to send spam email or engage in a distributed denial of service (DoS) attack) as well as lead to sensitive data contained on the network being compromised. As another consequence, an administrator of the network may need to reconfigure the firewall of the network device to restore the particular functionality that was modified, thereby wasting computing resources and/or network resources associated with restoring the particular functionality.

Some implementations, described herein, may provide for critical firewall functionality management. For example, a network device may monitor for and detect a request from an application of a user space of the network device to configure a firewall (e.g., a firewall provided by a kernel of the network device) with a rule. The network device may intercept the request and may analyze the rule to determine whether the rule modifies a particular functionality of the firewall. The network device may allow the request to configure the firewall when the rule does not modify the particular functionality of the firewall, or the network device may reject the request to configure the firewall when the rule modifies the particular functionality of the firewall.

In this way, network security can be improved, thereby conserving computing resources (e.g., processing resources, memory resources, and/or the like) and/or network resources associated with intrusions into the network that may otherwise be possible if particular functionality (e.g., critical functionality) of the firewall were modified. In addition, system users associated with the network device may be given permission to modify the firewall configuration of the network device in a customized manner necessary to improve network security. In this way, the present network device permits customized firewall configurations by system users without jeopardizing the security and stability of the network device and the network that includes the network device because the network device prevents modification of, for example, critical functionality of the firewall. Moreover, the network device maintains a particular firewall configuration of an administrator or a manufacturer of the network device, thereby conserving computing resources (e.g., processing resources, memory resources, and/or the like) and/or network resources that would otherwise be wasted restoring the particular firewall configuration when modified by a system user of the network device.

FIG. 1 is a diagram of an example implementation 100 described herein. As shown in FIG. 1, example implementation 100 can include a user space application, an intercept library, a firewall process, and a firewall that may be associated with a network device. In some implementations, the user space application, the intercept library, and the firewall process may be associated with a user space of the network device, and the firewall may be provided by a kernel (e.g., a Linux kernel) of the network device, as described below with regard to FIG. 2.

The firewall may be configured with rules by an administrator of the network device or a network that includes the network device, a manufacturer of the network device, and/or a developer of the kernel (collectively referred to herein as an "administrator"). The rules may provide a particular functionality to the firewall (e.g., a critical functionality) that is to be maintained in order to provide a level of security to the network device and/or the network that includes the network device.

In some implementations, the firewall is provided by a Netfilter framework of the kernel (e.g., a Linux kernel) of the network device. The Netfilter framework includes tables containing sets of rules that are used by the kernel to control the process of packet filtering. An application associated with a user space of the network device (e.g., an "iptables" application) may facilitate inserting, modifying, and removing rules in the tables. If a packet received by the network device matches a rule in a table, the network device may take an action on the packet that is specified in the rule (e.g., allow the packet to pass, block the packet, quarantine the packet, copy the packet for further inspection (e.g., deep packet inspection), etc.). Rules may be grouped in chains according to the types of packets to which the rules relate. For example, rules dealing with incoming packets may be added to an "input" chain.

According to the Netfilter framework, when a packet reaches the firewall, the kernel examines information of the packet to determine a manner for processing the packet. For example, the kernel may direct the packet to the input chain of a table if the packet originated from outside the network and is destined for a device of the network. After being directed to a particular chain, the information of the packet may be compared with a first rule in the chain. If the packet matches the first rule, the kernel performs the action specified by the first rule (e.g., allow the packet, block the packet, etc.). Otherwise, the information of the packet may be compared to a second rule of the chain, and so forth, until a match is determined. A default action may be taken (e.g., block the packet) if no match is determined. In some aspects of the Netfilter framework, a table may place an internal kernel "mark" on the packet that designates the packet for further processing in other tables and/or by other networking tools according to the mark.

While the description to follow will be described in terms of an example of a firewall according to the Netfilter framework, the description is not limited to this particular example. Implementations described herein also apply to other frameworks, platforms, applications, and/or hardware for provisioning a firewall on a network device.

As shown by FIG. 1, and by reference number 105, the network device may monitor for and detect a request to configure the firewall of the network device with a rule. In some implementations, the network device may monitor for and detect a request to configure the firewall using an intercept library of the network device.

The request may be intended for a data structure (e.g., a database, a linked list, a table, and/or the like) provided by the kernel of the network device for storing rules for the firewall. The request may originate from an application associated with a user space of the network device. For example, the application may be a third-party application associated with the user space of the network device. Continuing with the previous example, a system user seeking to configure the firewall with a rule may cause the third-party application associated with the user space to transmit the request to configure the firewall.

The application may transmit the request to configure the firewall using a command (e.g., a socket system call, such as "setsockopt( )" using the "IPT_SO_SET_REPLACE" option). The command may have a default definition in a default library (e.g., a shared library) that is linked to the application of the user space at a run time of the application. The default definition may permit the application of the user space to configure the firewall with the rule.

In some implementations, the rule of the request may relate to a policy for processing packets (e.g., the policy may prescribe that packets originating from a particular address outside of the network are to be allowed). Additionally, or alternatively, the rule of the request may relate to a definition for a mark that is to be applied to packets. For example, the definition may specify that packets meeting certain criteria are to be given a mark (e.g., an identifier). The definition may further specify that the kernel is to apply a particular action to a packet that is given the mark. In some implementations, the rule of the request may relate to a command associated with the firewall (e.g., a command to delete all rules configured for the firewall, a command to delete all statistics relating to processing performed by the firewall, etc.).

As shown by reference number 110, the network device may intercept the request to configure the firewall with the rule before the firewall is configured with the rule. In some implementations, the network device may intercept the request using an intercept library of the network device. The intercept library may be a shared library that contains a revised definition of the command (e.g., the socket system call, such as "setsockopt( )" using the "IPT_SO_SET_REPLACE" option). The revised definition of the command may modify the default definition of the command provided in the default library. For example, the revised definition may prescribe that the network device is to intercept a request to configure the firewall (i.e., a request to configure the firewall that is made using the command) prior to configuring the firewall with the rule (i.e., prior to processing the request according to the default definition of the command).

In some implementations, the network device may load the intercept library at a run time of the application of the user space (e.g., a third-party application of the user space). For example, at a run time of the application, the network device may load the intercept library before loading the default library. In this way, the revised definition provided in the intercept library will replace the default definition provided in the default library, such that requests to configure the firewall that are made using the command will be processed according to the revised definition of the intercept library.

In some implementations, the network device may not employ an intercept library and may intercept the request to configure the firewall using a module of the kernel of the network device. This may be suitable where an application of the user space is statically compiled with the default library. The module of the kernel may include a revised definition of the command that replaces the default definition of the command. In this way, requests to configure the firewall from an application of the user space (e.g., requests to configure the firewall made using the command) may be processed by the kernel module.

As shown by reference number 115, the network device (e.g., according to the command as defined by the intercept library) may direct the rule of the request to a firewall process of the network device based on intercepting the request. The firewall process may be associated with the user space of the network device. Accordingly, in some implementations, such as where the request is intercepted by the module of the kernel, the rule may be directed to the firewall process via a socket (e.g., a netlink socket).

In some implementations, the firewall process may be associated with information identifying a particular functionality of the firewall (e.g., a critical functionality). For example, prior to obtaining the rule, the firewall process may have configured the firewall with one or more rules provided by an administrator of the network device (e.g., provided via a command line interface associated with the network device). As a result, the firewall process may contain, or have access to, information identifying the one or more rules previously configured by the firewall process. In some implementations, these one or more rules previously configured by the firewall process may define, or partially define, a particular functionality of the firewall.

In some implementations, the particular functionality of the firewall may relate to a configuration of the firewall provided by an administrator of the network device. For example, the particular functionality of the firewall may relate to one or more of a reserved mark of the firewall configured by the administrator, a rule of the firewall configured by the administrator (e.g., via a command line interface of the network device), a rule of the firewall that is associated with metadata that identifies the rule as being associated with the particular functionality, or a statistic associated with any of the foregoing.

In some implementations, the particular functionality of the firewall may be a critical functionality of the firewall configured by an administrator of the network device. For example, the critical functionality of the firewall may relate to one or more of a reserved mark of the firewall configured by the administrator, a critical rule of the firewall configured by the administrator (e.g., via a command line interface of the network device), a critical rule of the firewall that is associated with metadata that identifies the rule as critical, or a statistic associated with any of the foregoing. In some implementations, the critical functionality of the firewall may be associated with one or more reserved marks, critical rules, and/or statistics relating to traffic on the network.

As shown by reference number 120, the network device may analyze the rule of the request to determine whether the rule modifies a particular functionality (e.g., a critical functionality) of the firewall. In some implementations, the network device may analyze the rule of the request using the firewall process. For example, the firewall process may determine that the rule modifies the particular functionality of the firewall when the rule is intended to modify a particular rule of the firewall. As a further example, the firewall process may determine that the rule modifies the particular functionality of the firewall when the rule defines a mark that is a reserved mark (e.g., a reserved mark defined by an administrator). As another example, the firewall process may determine that the rule modifies the particular functionality of the firewall when the rule is provided with a higher priority (e.g., a higher priority in a chain of rules) than a particular rule associated with the particular functionality of the firewall, and the rule, if applied prior to the particular rule, would modify the particular functionality of the firewall (e.g., where the particular rule prescribes for certain traffic to be blocked and the rule prescribes for that certain traffic to be allowed). As an additional example, the firewall process may determine that the rule modifies the particular functionality of the firewall when the rule includes a command that would modify the particular functionality of the firewall (e.g., a command to delete all firewall rules, a command to delete all firewall statistics, etc.).

In some implementations, the firewall process, or another process of the network device, may generate a first hash value that identifies a first state of a set of particular rules (e.g., particular rules representing the particular functionality of the firewall, such as particular rules associated with metadata that identifies the particular rules as being associated with the particular functionality) and generate a second hash value that identifies a second state of the set of particular rules if the request to configure the firewall were to be allowed. Accordingly, the firewall process, or another process of the network device, may determine whether the first hash value is different from the second hash value and determine that the rule of the request modifies the particular functionality of the firewall when the first hash value is different from the second hash value.

As shown by reference number 125, the network device (e.g., using the firewall process) may provide an indication of whether the rule modifies the particular functionality of the firewall. For example, after analyzing the rule, the firewall process may return the indication of whether the rule modifies the particular functionality of the firewall. The indication may indicate that the rule modifies the particular functionality of the firewall, or the indication may indicate that the rule does not modify the particular functionality of the firewall. Additionally, or alternatively, the indication may indicate that the request associated with the rule is to be allowed, or the indication may indicate that the request associated with the rule is to be rejected. In some implementations, such as where the rule was directed to the firewall process by a module of the kernel, the indication may be provided from the firewall process to the module via a socket (e.g., a netlink socket).

As shown by reference number 130, the network device (e.g., using the command defined in the intercept library) may process the request to selectively configure the firewall based on the indication. For example, the network device may allow the request to configure the firewall based on determining (e.g., by the firewall process) that the rule does not modify the particular functionality of the firewall. In such cases, the network device may configure the firewall with the rule of the request (e.g., the network device may process the request according to the default definition of the command). For example, the network device may store the rule in a data structure (e.g., a database, a linked list, a table, and/or the like) associated with the firewall of the network device. In some implementations, the network device may determine a priority associated with the rule and store the rule in the data structure based on the priority associated with the rule.

In some implementations, the network device may reject the request to configure the firewall based on determining (e.g., by the firewall process) that the rule modifies the particular functionality of the firewall. The network device also may perform one or more additional actions based on determining that the rule modifies the particular functionality of the firewall. For example, based on determining that the rule modifies the particular functionality of the firewall, the network device may return an error message to a source of the request (e.g., to an application of the user space). As another example, based on determining that the rule modifies the particular functionality of the firewall, the network device may convert the rule for use by a packet forwarding component of the network device and implement the rule on the packet forwarding component of the network device (e.g., a line card of the network device). In this way, rules that are applicable to a line card of the network device can be implemented on the line card to provide for early detection and dropping of particular packets. In some implementations, where the rule of the request is a first rule of a set of rules that includes a second rule, the network device may reject the request to configure the firewall with the first rule based on determining that the first rule modifies the particular functionality of the firewall, and allow the request to configure the firewall with the second rule based on determining that the second rule does not modify the particular functionality of the firewall. In some implementations, based on determining that the rule modifies the particular functionality of the firewall, the network device may alter the rule of the request to obtain an altered rule that does not modify the particular functionality of the firewall and configure the firewall with the altered rule. For example, a rule relating to a command to delete all rules configured for the firewall may be altered by the network device to a rule relating to a command to delete only rules of a particular chain of rules (e.g., a particular chain of rules relating to a third-party application that transmitted the request to configure the firewall).

In this way, the network device may selectively implement requests to configure the firewall by the application of the user space according to whether the requests impact a particular functionality of the firewall. Accordingly, network security may be improved and computing resources and/or networking resources that may otherwise be diverted by intrusions into the network may be conserved. Additionally, computing resources and/or networking resources that may otherwise be expended restoring the particular functionality to the firewall caused by a modification may be conserved.

In some implementations, the network device may collect and store data relating to requests to configure the firewall, such as rejected requests to configure the firewall. The network device may generate statistics on the collected data, which may be used by an administrator to define or update a particular functionality of the firewall (e.g., a critical functionality of the firewall). In some implementations, the collected data may be used to train a machine learning model that is to be used to define a particular functionality of the firewall and/or to analyze a rule of a request to configure the firewall.

As indicated above, FIG. 1 is provided as an example. Other examples can differ from what is described with regard to FIG. 1.

Figure 2:
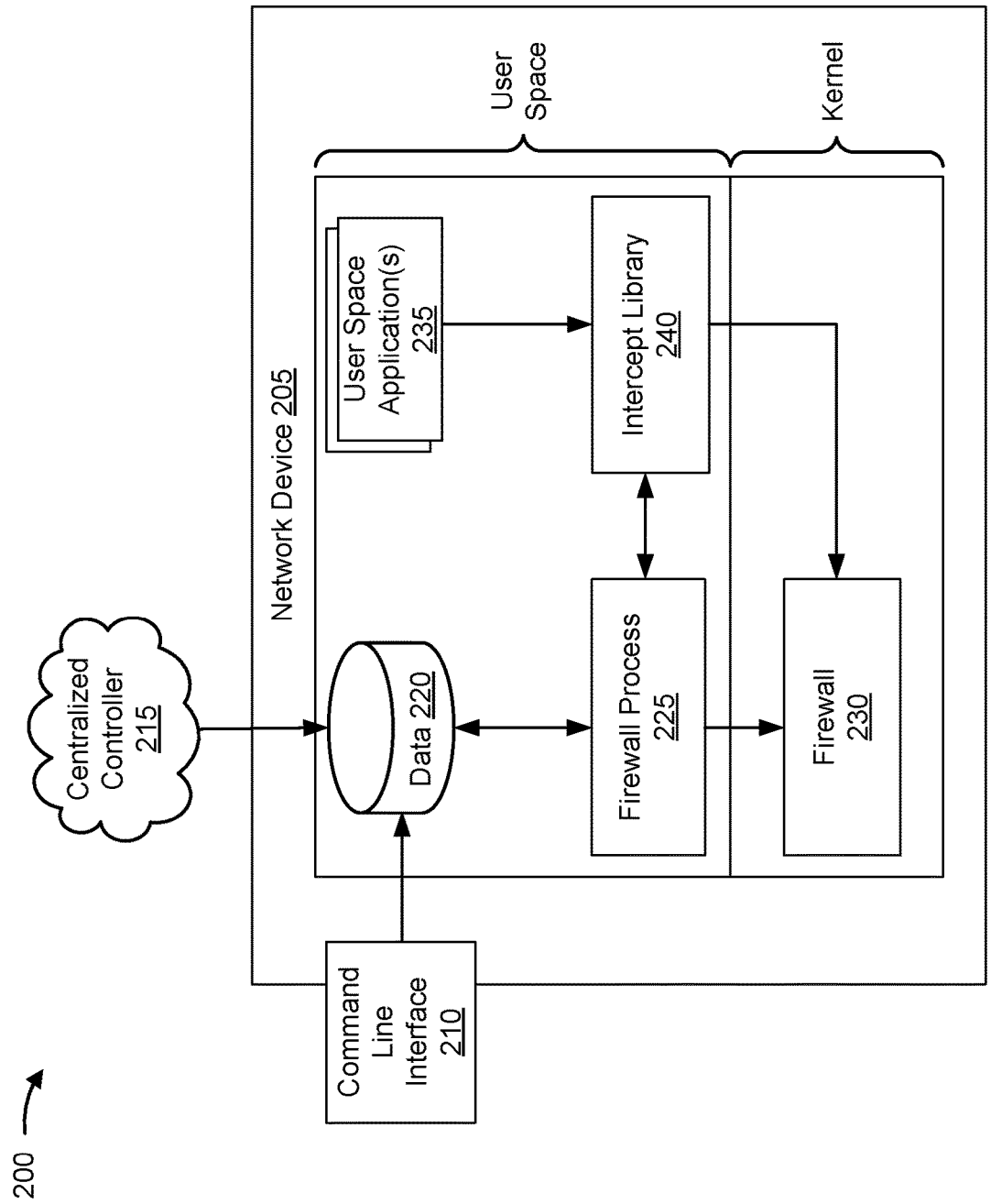
FIG. 2 is a diagram of an example implementation described herein.

FIG. 2 is a diagram of an example implementation 200 described herein. As shown in FIG. 2, network device 205 may include a data structure 220, a firewall process 225, a user space application 235, and an intercept library 240 in a user space of network device 205. As further shown in FIG. 2, network device 205 may include a firewall 230 in a kernel of network device 205.

Network device 205, using data structure 220 (e.g., a database, a linked list, a table, and/or the like) may store firewall objects received from a command line interface 210 or a centralized controller 215 (e.g., a centralized controller in a cloud computing environment that provides an interface for an administrator to configure network device 205). For example, an administrator of network device 205 may provide firewall rules via command line interface 210, and the firewall rules may be stored in data structure 220 as firewall objects.

Network device 205, using firewall process 225 (e.g., a daemon of network device 205), may configure the firewall objects stored in data structure 220 to firewall 230 in the kernel of the network device. Firewall 230 may be associated with a data structure, such as tables (e.g., tables configured according to the Netfilter framework), containing chains of firewall rules that are associated with hooks representing particular points in a networking stack of network device 205. For example, an incoming packet entering the networking stack, and before any routing decision is made, may trigger a pre-routing hook (e.g., a pre-routing hook of the Netfilter framework). Continuing with the previous example, the packet may be evaluated against a chain of firewall rules associated with the pre-routing hook (e.g., a chain of firewall rules configured for firewall 230) by the kernel of network device 205.

User space application 235 (e.g., a third-party user space application) may transmit a request to configure firewall 230 with a rule. For example, user space application 235 may make a call to a command to insert or to modify a rule in the data structure associated with firewall 230.

Network device 205, using intercept library 240, may intercept the request from user space application 235, as described above with regard to FIG. 1. Intercept library 240, may direct the rule of the request to firewall process 225 to determine whether the rule modifies a particular functionality of firewall 230, and obtain an indication from firewall process 225 as to whether the rule modifies the particular functionality of firewall 230. Intercept library 240 may process the call to the command to insert or to modify the rule for firewall 230 based on the indication indicating that the rule does not modify the particular functionality of firewall 230. Intercept library 240 may terminate the call to the command to insert or to modify the rule for firewall 230 based on the indication indicating that the rule modifies the particular functionality of firewall 230.

As indicated above, FIG. 2 is provided as an example. Other examples can differ from what is described with regard to FIG. 2.

Figure 3:
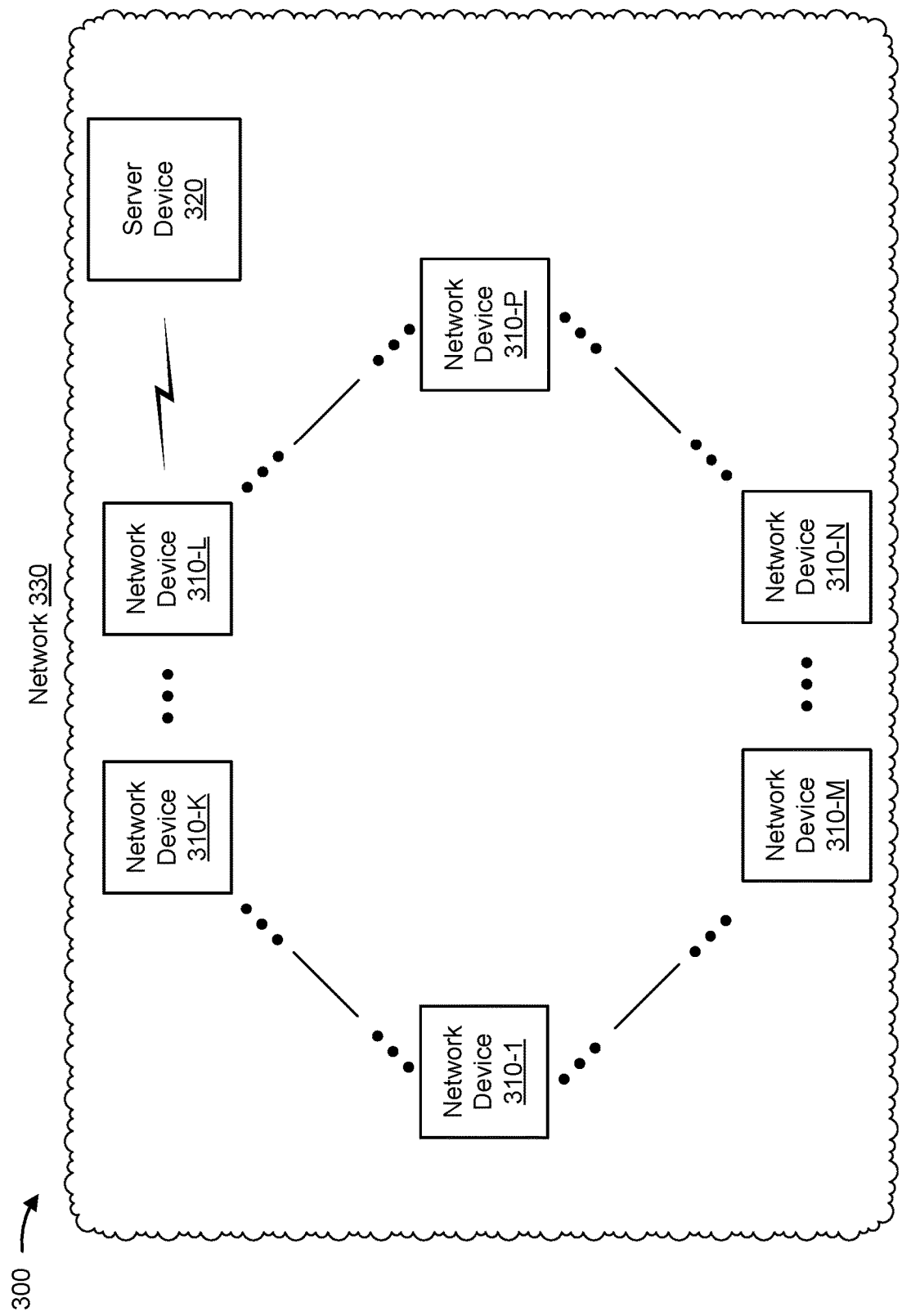
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include one or more network devices 310-1 through 310-P (P≥1) (hereinafter referred to collectively as "network devices 310," and individually as "network device 310"), a server device 320, and a network 330. Devices of environment 300 may interconnect via wired connections, wireless connections, or a combination of wired and wireless connections.

Network device 310 includes one or more devices (e.g., one or more traffic transfer devices) capable of processing and/or transferring traffic between endpoint devices. For example, network device 310 may include a firewall, a router, a gateway, a switch device, a hub, a bridge, a reverse proxy, a server (e.g., a proxy server), a top of rack (ToR) switch, a load balancer, a switch interface board, a controller, a switching element, a packet processing component, or a similar device. In some implementations, network device 310 may include a user space and a kernel. In some implementations, network device 310 may store firewall rules for a firewall in the kernel (e.g., a Linux kernel). In some implementations, network devices 310 may form a distributed architecture, such that a first network device 310 stores a first portion of the firewall rules and a second network device 310 stores a second portion of the firewall rules. In some implementations, network device 310 may include a packet routing component (e.g., one or more routing protocol software processes that provide route lookup, filtering, and switching on incoming data packets, as well as directing outbound packets to the appropriate interface for transmission to the network) and a packet forwarding component (e.g., one or more application-specific integrated circuits (ASICs) to perform Layer 2 and Layer 3 packet switching, route lookups, and packet forwarding). In some implementations, network device 310 may be a physical device implemented within a housing, such as a chassis. In some implementations, network device 310 may be a virtual device implemented by one or more computer devices of a cloud computing environment or a data center.

Server device 320 includes one or more devices capable of storing, processing, and/or routing information associated with routing network traffic. For example, server device 320 may include a server that includes computing resources that may be utilized in connection with traffic routing. In some implementations, server device 320 may include a communication interface that allows server device 320 to receive information from and/or transmit information to other devices in environment 300, such as one or more network devices 310.

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

In some implementations, network device 310 and/or server device 320 may be a virtual device implemented by one or more computing devices of a cloud computing environment or a data center.

The number and arrangement of devices shown in FIG. 3 are provided as an example. In practice, there may be additional devices, fewer devices, different devices and/or networks, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4A:
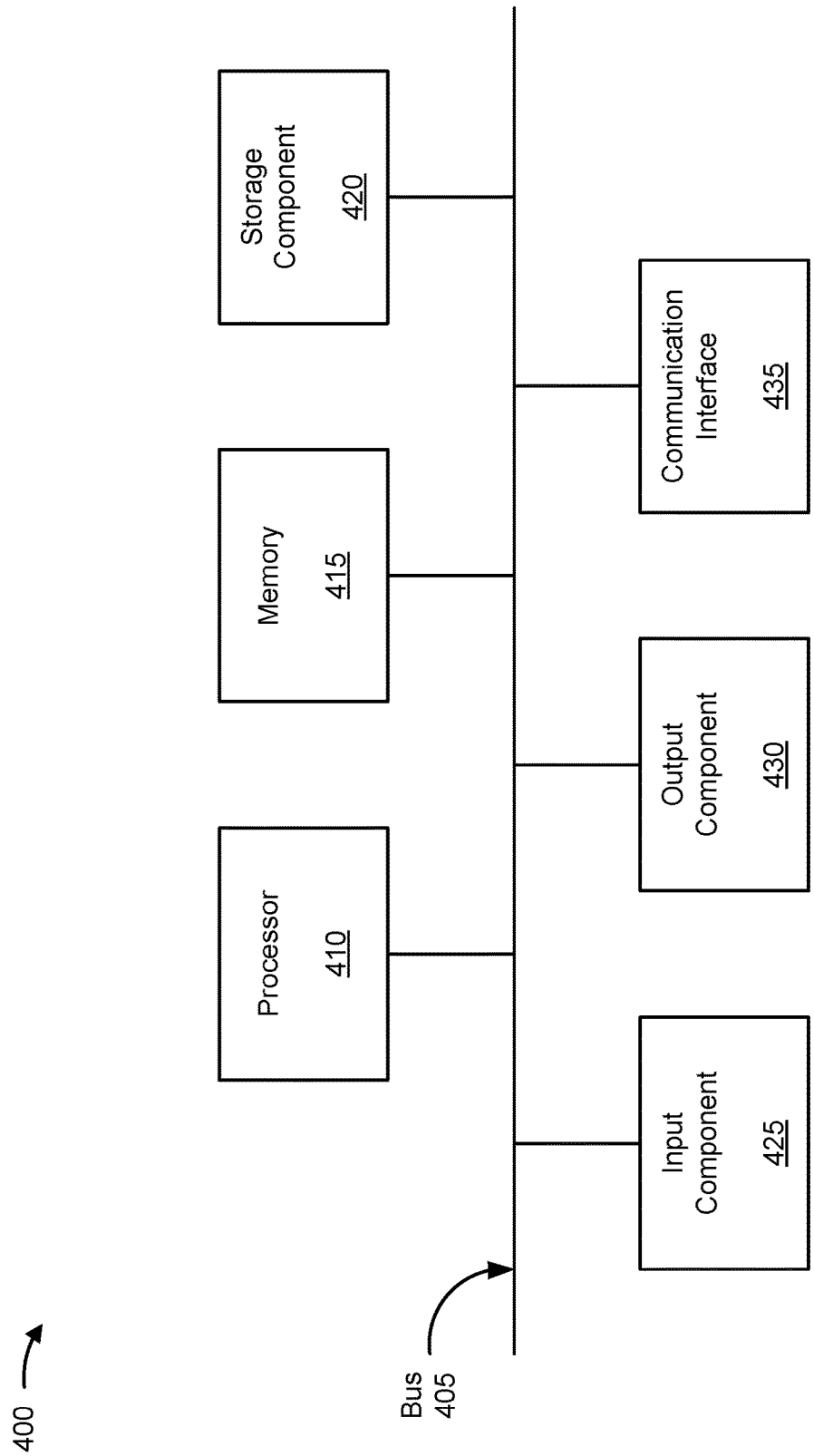
FIGS. 4A and 4B are diagrams of example components of one or more devices of FIG. 3.
Figure 4B:
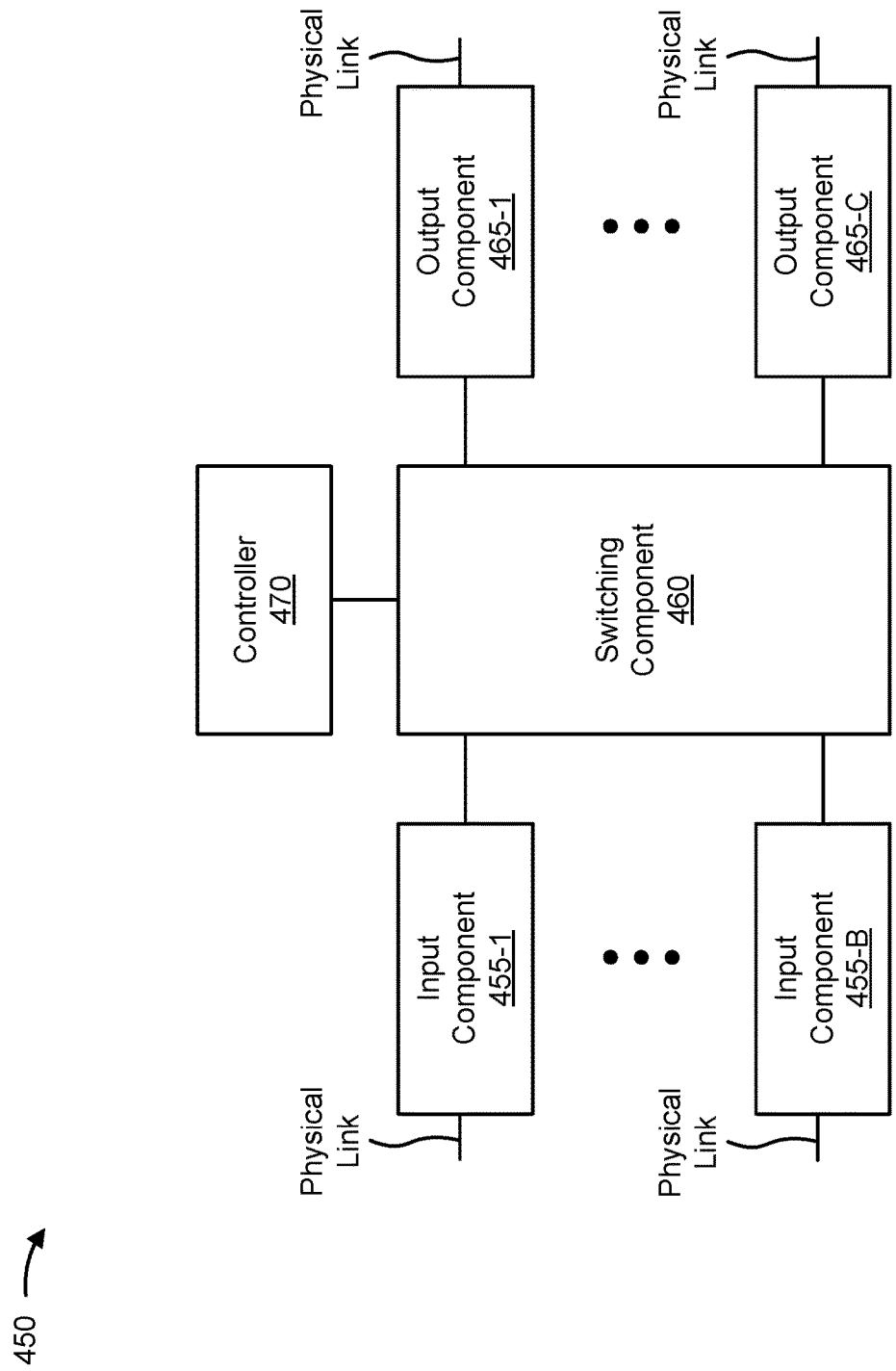

FIGS. 4A-4B are diagrams of example components of one or more devices of FIG. 3. FIG. 4A is a diagram of example components of a device 400. Device 400 may correspond to network device 310 and/or server device 320. In some implementations, network device 310 and/or server device 320 may include one or more devices 400 and/or one or more components of device 400. As shown in FIG. 4A, device 400 may include a bus 405, a processor 410, a memory 415, a storage component 420, an input component 425, an output component 430, and a communication interface 435.

Bus 405 includes a component that permits communication among the components of device 400. Processor 410 is implemented in hardware, firmware, or a combination of hardware and software. Processor 410 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 410 includes one or more processors capable of being programmed to perform a function. Memory 415 includes a random access memory (RAM), a read only memory (ROM), and/or another type of dynamic or static storage device (e.g., a flash memory, a magnetic memory, and/or an optical memory) that stores information and/or instructions for use by processor 410.

Storage component 420 stores information and/or software related to the operation and use of device 400. For example, storage component 420 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 425 includes a component that permits device 400 to receive information, such as via user input (e.g., a touch screen display, a keyboard, a keypad, a mouse, a button, a switch, and/or a microphone). Additionally, or alternatively, input component 425 may include a sensor for sensing information (e.g., a global positioning system (GPS) component, an accelerometer, a gyroscope, and/or an actuator). Output component 430 includes a component that provides output information from device 400 (e.g., a display, a speaker, and/or one or more light-emitting diodes (LEDs)).

Communication interface 435 includes a transceiver-like component (e.g., a transceiver and/or a separate receiver and transmitter) that enables device 400 to communicate with other devices, such as via a wired connection, a wireless connection, or a combination of wired and wireless connections. Communication interface 435 may permit device 400 to receive information from another device and/or provide information to another device. For example, communication interface 435 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 410 executing software instructions stored by a non-transitory computer-readable medium, such as memory 415 and/or storage component 420. A computer-readable medium is defined herein as a non-transitory memory device. A memory device includes memory space within a single physical storage device or memory space spread across multiple physical storage devices.

Software instructions may be read into memory 415 and/or storage component 420 from another computer-readable medium or from another device via communication interface 435. When executed, software instructions stored in memory 415 and/or storage component 420 may cause processor 410 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device 400 may include additional components, fewer components, different components, or differently arranged components than those shown in FIG. 4A. Additionally, or alternatively, a set of components (e.g., one or more components) of device 400 may perform one or more functions described as being performed by another set of components of device 400.

FIG. 4B is a diagram of example components of a device 450. Device 450 may correspond to network device 310. In some implementations, network device 310 may include one or more devices 450 and/or one or more components of device 450. As shown in FIG. 4B, device 450 may include one or more input components 455-1 through 455-B (B≥1) (hereinafter referred to collectively as input components 455, and individually as input component 455), a switching component 460, one or more output components 465-1 through 465-C (C≥1) (hereinafter referred to collectively as output components 465, and individually as output component 465), and a controller 470.

Input component 455 may be points of attachment for physical links and may be points of entry for incoming traffic, such as packets. Input component 455 may process incoming traffic, such as by performing data link layer encapsulation or decapsulation. In some implementations, input component 455 may send and/or receive packets. In some implementations, input component 455 may include an input line card that includes one or more packet processing components (e.g., in the form of integrated circuits), such as one or more interface cards (IFCs), packet forwarding components, line card controller components, input ports, processors, memories, and/or input queues. In some implementations, device 450 may include one or more input components 455.

Switching component 460 may interconnect input components 455 with output components 465. In some implementations, switching component 460 may be implemented via one or more crossbars, via busses, and/or with shared memories. The shared memories may act as temporary buffers to store packets from input components 455 before the packets are eventually scheduled for delivery to output components 465. In some implementations, switching component 460 may enable input components 455, output components 465, and/or controller 470 to communicate.

Output component 465 may store packets and may schedule packets for transmission on output physical links. Output component 465 may support data link layer encapsulation or decapsulation, and/or a variety of higher-level protocols. In some implementations, output component 465 may send packets and/or receive packets. In some implementations, output component 465 may include an output line card that includes one or more packet processing components (e.g., in the form of integrated circuits), such as one or more IFCs, packet forwarding components, line card controller components, output ports, processors, memories, and/or output queues. In some implementations, device 450 may include one or more output components 465. In some implementations, input component 455 and output component 465 may be implemented by the same set of components (e.g., and input/output component may be a combination of input component 455 and output component 465).

Controller 470 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 470 may include one or more processors that can be programmed to perform a function.

In some implementations, controller 470 may include a RAM, a ROM, and/or another type of dynamic or static storage device (e.g., a flash memory, a magnetic memory, an optical memory, etc.) that stores information and/or instructions for use by controller 470.

In some implementations, controller 470 may communicate with other devices, networks, and/or systems connected to device 400 to exchange information regarding network topology. Controller 470 may create routing tables based on the network topology information, create forwarding tables based on the routing tables, and forward the forwarding tables to input components 455 and/or output components 465. Input components 455 and/or output components 465 may use the forwarding tables to perform route lookups for incoming and/or outgoing packets.

Controller 470 may perform one or more processes described herein. Controller 470 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 470 from another computer-readable medium or from another device via a communication interface. When executed, software instructions stored in a memory and/or storage component associated with controller 470 may cause controller 470 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device 450 may include additional components, fewer components, different components, or differently arranged components than those shown in FIG. 4B. Additionally, or alternatively, a set of components (e.g., one or more components) of device 450 may perform one or more functions described as being performed by another set of components of device 450.

FIG. 5 is a flow chart of an example process 500 for critical firewall functionality management. In some implementations, one or more process blocks of FIG. 5 may be performed by a network device (e.g., network device 205 or network device 310). In some implementations, one or more process blocks of FIG. 5 may be performed by another device or a group of devices separate from or including the network device, such as a server device (e.g., server device 320).

As shown in FIG. 5, process 500 may include detecting a request to configure a firewall of a network device with a rule, wherein the request to configure the firewall originated from an application associated with a user space of the network device, and wherein the firewall is associated with a kernel of the network device (block 510). For example, the network device (e.g., using processor 410, memory 415, storage component 420, controller 470, and/or the like) may detect a request to configure a firewall of a network device with a rule, as described above. In some implementations, the request to configure the firewall may originate from an application associated with a user space of the network device. In some implementations, the firewall may be associated with a kernel of the network device.

As further shown in FIG. 5, process 500 may include intercepting the request to configure the firewall before the firewall is configured with the rule (block 520). For example, the network device (e.g., using processor 410, memory 415, storage component 420, controller 470, and/or the like) may intercept the request to configure the firewall before the firewall is configured with the rule, as described above.

As further shown in FIG. 5, process 500 may include analyzing, based on intercepting the request to configure the firewall, the rule to determine whether the rule modifies a critical functionality of the firewall (block 530). For example, the network device (e.g., using processor 410, memory 415, storage component 420, controller 470, and/or the like) may analyze, based on intercepting the request to configure the firewall, the rule to determine whether the rule modifies a critical functionality of the firewall, as described above.

As further shown in FIG. 5, process 500 may include rejecting the request to configure the firewall based on determining that the rule modifies the critical functionality of the firewall (block 540). For example, the network device (e.g., using processor 410, memory 415, storage component 420, controller 470, and/or the like) may reject the request to configure the firewall based on determining that the rule modifies the critical functionality of the firewall, as described above.

Process 500 may include additional implementations, such as any single implementation or any combination of implementations described below and/or in connection with one or more other processes described elsewhere herein.

In some implementations, the critical functionality of the firewall relates to one or more of a reserved mark of the firewall, a first critical rule configured by an administrator of the network device, a second critical rule that is associated with metadata that identifies the second critical rule as critical, or a statistic associated with the first critical rule or the second critical rule. In some implementations, the first critical rule is configured by the administrator via a command line interface associated with the network device.

In some implementations, the application may transmit the request to configure the firewall using a command that has a first definition in a first library prescribing that the network device is to allow the application associated with the user space to configure the firewall with the rule. In some implementations, the network device may load a second library that includes a second definition of the command prescribing that the network device is to intercept the request to configure the firewall prior to configuring the firewall with the rule, where the second definition of the second library replaces the first definition of the first library.

In some implementations, a process may be executing on the network device, where the process is associated with information identifying the critical functionality of the firewall. In some implementations, the network device may analyze, using the process, the rule to determine whether the rule modifies the critical functionality of the firewall.

In some implementations, when rejecting the request to configure the firewall, the network device may reject the request to configure the firewall and convert the rule for use by a packet forwarding component of the network device, based on determining that the rule modifies the critical functionality of the firewall. In some implementations, the rule may be implemented by the packet forwarding component of the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
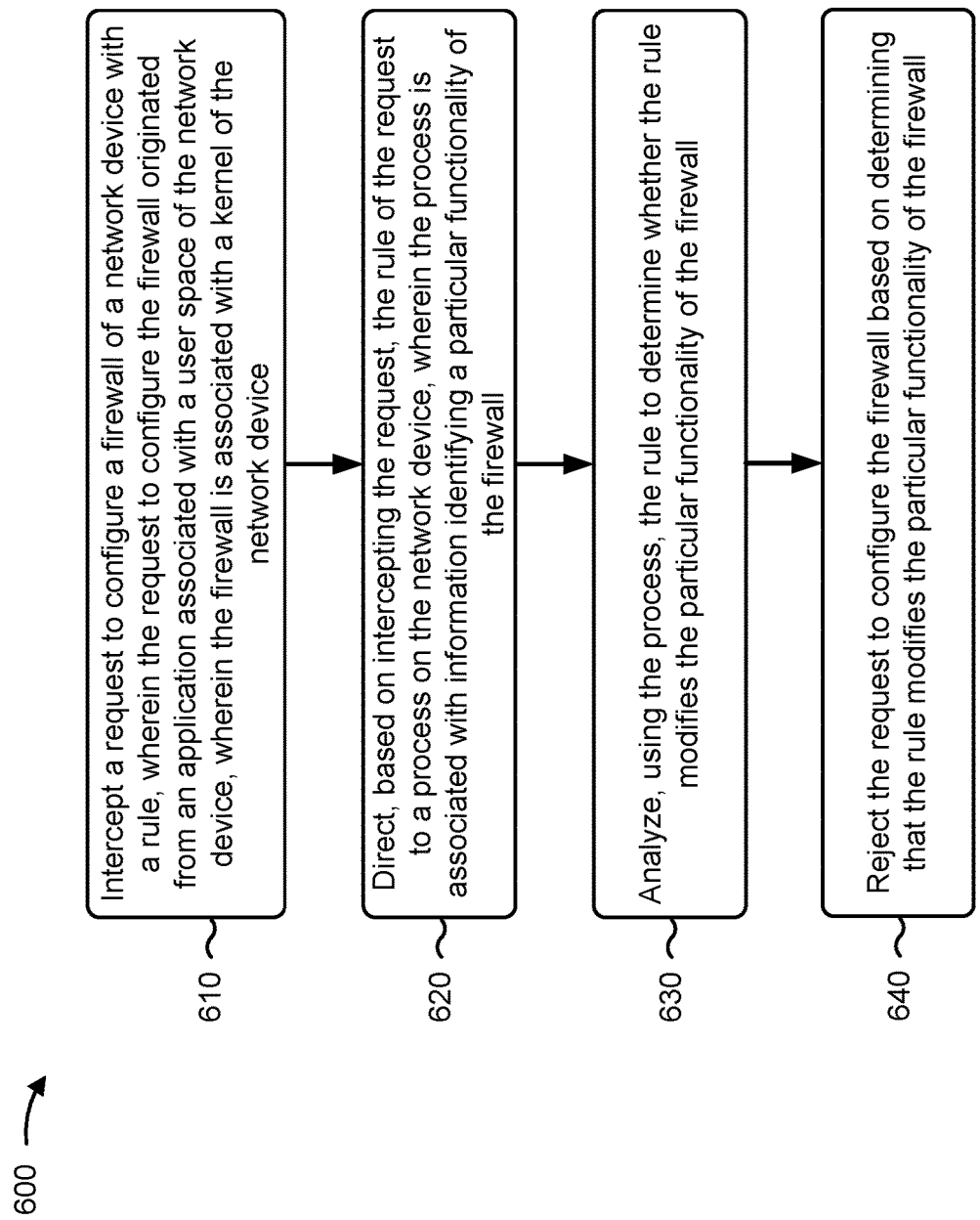

FIG. 6 is a flow chart of an example process 600 for critical firewall functionality management. In some implementations, one or more process blocks of FIG. 6 may be performed by a network device (e.g., network device 205 or network device 310). In some implementations, one or more process blocks of FIG. 6 may be performed by another device or a group of devices separate from or including the network device, such as a server device (e.g., server device 320).

As shown in FIG. 6, process 600 may include intercepting a request to configure a firewall of a network device with a rule, wherein the request to configure the firewall originated from an application associated with a user space of the network device, and wherein the firewall is associated with a kernel of the network device (block 610). For example, the network device (e.g., using processor 410, memory 415, storage component 420, controller 470, and/or the like) may intercept a request to configure a firewall of the network device with a rule, as described above. In some implementations, the request to configure the firewall may originate from an application associated with a user space of the network device. In some implementations, the firewall may be associated with a kernel of the network device.

As further shown in FIG. 6, process 600 may include directing, based on intercepting the request, the rule of the request to a process on the network device, wherein the process is associated with information identifying a particular functionality of the firewall (block 620). For example, the network device (e.g., using processor 410, memory 415, storage component 420, controller 470, and/or the like) may direct, based on intercepting the request, the rule of the request to a process on the network device, as described above. In some implementations, the process is associated with information identifying a particular functionality of the firewall.

As further shown in FIG. 6, process 600 may include analyzing, using the process, the rule to determine whether the rule modifies the particular functionality of the firewall (block 630). For example, the network device (e.g., using processor 410, memory 415, storage component 420, controller 470, and/or the like) may analyze, using the process, the rule to determine whether the rule modifies the particular functionality of the firewall, as described above.

As further shown in FIG. 6, process 600 may include rejecting the request to configure the firewall based on determining that the rule modifies the particular functionality of the firewall (block 640). For example, the network device (e.g., using processor 410, memory 415, storage component 420, controller 470, and/or the like) may reject the request to configure the firewall based on determining that the rule modifies the particular functionality of the firewall, as described above.

Process 600 may include additional implementations, such as any single implementation or any combination of implementations described below and/or in connection with one or more other processes described elsewhere herein.

In some implementations, the particular functionality of the firewall relates to one or more of a reserved mark of the firewall, a first rule configured by an administrator of the network device, a second rule that is associated with metadata that identifies the second rule as being associated with the particular functionality, or a statistic associated with the first rule or the second rule.

In some implementations, the rule is a first rule of a set of rules that includes a second rule. In some implementations, when rejecting the request to configure the firewall, the network device may reject the request to configure the firewall with the first rule based on determining that the first rule modifies the particular functionality of the firewall, and allow the request to configure the firewall with the second rule based on determining that the second rule does not modify the particular functionality of the firewall.

In some implementations, when analyzing the rule, the network device may analyze the rule to determine whether the rule is provided with a higher priority than a particular rule associated with the particular functionality of the firewall, and determine whether the rule, if applied prior to the particular rule, would modify the particular functionality of the firewall.

In some implementations, the network device may alter the rule to obtain an altered rule, where the altered rule does not modify the particular functionality of the firewall, and allow the request to configure the firewall with the altered rule.

In some implementations, the application may transmit the request to configure the firewall using a command, where a module of the kernel of the network device includes a definition of the command prescribing that the network device is to direct the rule of the request to the process on the network device.

In some implementations, the particular functionality may be implemented by a set of particular rules of the firewall. In some implementations, when analyzing the rule, the network device may analyze a first hash value that identifies a first state of the set of particular rules to determine whether there is a difference with a second hash value that identifies a second state of the set of particular rules if the request to configure the firewall were to be allowed, and the network device may determine that the rule modifies the particular functionality of the firewall when the first hash value is different from the second hash value.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for critical firewall functionality management. In some implementations, one or more process blocks of FIG. 7 may be performed by a network device (e.g., network device 205 or network device 310). In some implementations, one or more process blocks of FIG. 7 may be performed by another device or a group of devices separate from or including the network device, such as a server device (e.g., server device 320).

As shown in FIG. 7, process 700 may include detecting a request to configure a firewall with a rule (block 710). For example, the network device (e.g., using processor 410, memory 415, storage component 420, controller 470, and/or the like) may detect a request to configure a firewall with a rule, as described above.

As further shown in FIG. 7, process 700 may include intercepting the request before the firewall is configured with the rule (block 720). For example, the network device (e.g., using processor 410, memory 415, storage component 420, controller 470, and/or the like) may intercept the request before the firewall is configured with the rule, as described above.

As further shown in FIG. 7, process 700 may include providing, to a process and based on intercepting the request, information identifying the rule, wherein the process is associated with information identifying a critical functionality of the firewall (block 730). For example, the network device (e.g., using processor 410, memory 415, storage component 420, controller 470, and/or the like) may provide, to a process and based on intercepting the request, information identifying the rule, as described above. In some implementations, the process is associated with information identifying a critical functionality of the firewall.

As further shown in FIG. 7, process 700 may include obtaining, from the process, an indication whether the rule modifies the critical functionality of the firewall (block 740). For example, the network device (e.g., using processor 410, memory 415, storage component 420, controller 470, and/or the like) may obtain, from the process, an indication whether the rule modifies the critical functionality of the firewall, as described above.

As further shown in FIG. 7, process 700 may include processing the request to configure the firewall based on the indication (block 750). For example, the network device (e.g., using processor 410, memory 415, storage component 420, controller 470, and/or the like) may process the request to configure the firewall based on the indication, as described above.

Process 700 may include additional implementations, such as any single implementation or any combination of implementations described below and/or in connection with one or more other processes described elsewhere herein.

In some implementations, the critical functionality of the firewall relates to one or more of a reserved mark, a first critical rule configured by an administrator, a second critical rule that is associated with metadata that identifies the second critical rule as critical, or a statistic associated with the first critical rule or the second critical rule.

In some implementations, when processing the request to configure the firewall, the network device may return an error message to a source of the request based on the indication indicating that the rule modifies the critical functionality of the firewall.

In some implementations, when processing the request to configure the firewall, the network device may configure the firewall with the rule based on the indication indicating that the rule does not modify the critical functionality of the firewall.

In some implementations, when processing the request to configure the firewall, the network device may alter the rule to obtain an altered rule based on the indication indicating that the rule modifies the critical functionality of the firewall, where the altered rule does not modify the critical functionality of the firewall. In some implementations, the network device may configure the firewall with the altered rule.

In some implementations, the network device may compare, using the process, the rule and the critical functionality of the firewall to determine whether the rule modifies the critical functionality of the firewall.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   loading, by a network device, an intercept library that includes a definition prescribing that the network device is to intercept a request to configure a firewall of the network device with a rule before the firewall is configured with a rule;
   detecting, by the network device, the request to configure the firewall with the rule,
      wherein the request to configure the firewall with the rule originated from an application associated with a user space of the network device,
      wherein the application is to transmit the request to configure the firewall with the rule using a command, and
      wherein the firewall is associated with a kernel of the network device;
   intercepting, by the network device and based on the definition, the request to configure the firewall with the rule before the firewall is configured with the rule;
   analyzing, by the network device and based on intercepting the request to configure the firewall with the rule, the rule to determine whether the rule modifies a critical functionality of the firewall,
      wherein the critical functionality of the firewall prevents malicious traffic from bypassing the firewall; and
   rejecting, by the network device, the request to configure the firewall with the rule based on determining that the rule modifies the critical functionality of the firewall.

2. The method of claim 1, wherein the critical functionality of the firewall relates to one or more of:
   a reserved mark of the firewall,
   a first critical rule configured by an administrator of the network device,
   a second critical rule that is associated with metadata that identifies the second critical rule as critical, or
   a statistic associated with the first critical rule or the second critical rule.

3. The method of claim 2, wherein the first critical rule is configured by the administrator via a command line interface associated with the network device.

4. The method of claim 1, wherein the definition is a first definition,
   wherein the command has a second definition in a second library,
      wherein the second definition prescribes that the network device is to allow the application associated with the user space to configure the firewall with the rule, and
   wherein intercepting the request to configure the firewall with the rule comprises:
      replacing the second definition with the first definition.

5. The method of claim 1,
   wherein a process is executing on the network device,
      wherein the process is associated with information identifying the critical functionality of the firewall,
   wherein analyzing the rule comprises:

analyzing, using the process, the rule to determine whether the rule modifies the critical functionality of the firewall.

6. The method of claim 1, wherein rejecting the request to configure the firewall with the rule comprises:
rejecting the request to configure the firewall with the rule and converting the rule for use by a packet forwarding component of the network device, based on determining that the rule modifies the critical functionality of the firewall.

7. The method of claim 6, wherein the rule is implemented by the packet forwarding component of the network device.

8. A network device, comprising:
one or more memories; and
one or more processors to:
load an intercept library that includes a definition prescribing that the network device is to intercept a request to configure a firewall of the network device with a rule before the firewall is configured with a rule;
Intercept the request to configure the firewall with the rule based on the definition,
wherein the request to configure the firewall with the rule originated from an application associated with a user space of the network device,
wherein the application is to transmit the request to configure the firewall with the rule using a command, and
wherein the firewall is associated with a kernel of the network device;
and
direct, based on intercepting the request to configure the firewall with the rule, the rule to a process on the network device,
wherein the process is associated with information identifying a particular functionality of the firewall,
wherein the particular functionality of the firewall prevents malicious traffic from bypassing the firewall;
analyze, using the process, the rule to determine whether the rule modifies the particular functionality of the firewall; and
reject the request to configure the firewall with the rule based on determining that the rule modifies the particular functionality of the firewall.

9. The network device of claim 8, wherein the particular functionality of the firewall relates to one or more of:
a reserved mark of the firewall,
a first rule configured by an administrator of the network device,
a second rule that is associated with metadata that identifies the second rule as being associated with the particular functionality of the firewall, or
a statistic associated with the first rule or the second rule.

10. The network device of claim 8, wherein the rule is a first rule of a set of rules,
wherein the set of rules includes a second rule,
wherein the one or more processors, when rejecting the request to configure the firewall with the rule, are to:
reject the request to configure the firewall with the first rule based on determining that the first rule modifies the particular functionality of the firewall and allow the request to configure the firewall with the second rule based on determining that the second rule does not modify the particular functionality of the firewall.

11. The network device of claim 8, wherein the one or more processors, when analyzing the rule, are to:
analyze the rule to determine whether the rule is provided with a higher priority than a particular rule associated with the particular functionality of the firewall; and
determine whether the rule, if applied prior to the particular rule, would modify the particular functionality of the firewall.

12. The network device of claim 8, wherein the one or more processors are further to:
alter the rule to obtain an altered rule,
wherein the altered rule does not modify the particular functionality of the firewall; and
allow the request to configure the firewall with the altered rule.

13. The network device of claim 8, wherein the particular functionality of the firewall is implemented by a set of particular rules of the firewall,
wherein the one or more processors, when analyzing the rule, are to:
analyze a first hash value that identifies a first state of the set of particular rules to determine whether there is a difference with a second hash value that identifies a second state of the set of particular rules if the request to configure the firewall with the rule were to be allowed; and
determine that the rule modifies the particular functionality of the firewall when the first hash value is different from the second hash value.

14. A non-transitory computer-readable medium storing instructions, the instructions comprising:
one or more instructions that, when executed by one or more processors, cause the one or more processors to:
load an intercept library that includes a definition prescribing that the one or more processors are to intercept a request to configure a firewall with a rule before the firewall is configured with the rule;
detect the request to configure the firewall with the rule,
wherein the request to configure the firewall with the rule originated from an application, and
wherein the application is to transmit the request to configure the firewall with the rule using a command;
intercept, based on the definition, the request to configure the firewall with the rule before the firewall is configured with the rule;
provide, to a process to be executed by the one or more processors and based on intercepting the request to configure the firewall with the rule, information identifying the rule,
wherein the process is associated with information identifying a critical functionality of the firewall,
wherein the critical functionality of the firewall prevents malicious traffic from bypassing the firewall;
obtain, from the process, an indication whether the rule modifies the critical functionality of the firewall; and
process the request to configure the firewall with the rule based on the indication.

15. The non-transitory computer-readable medium of claim 14, wherein the critical functionality of the firewall relates to one or more of:
a reserved mark,
a first critical rule configured by an administrator,
a second critical rule that is associated with metadata that identifies the second critical rule as critical, or a statistic associated with the first critical rule or the second critical rule.

16. The non-transitory computer-readable medium of claim 14, wherein the one or more instructions, that cause the one or more processors to process the request to configure the firewall with the rule, cause the one or more processors to:

return an error message to a source of the request to configure the firewall with the rule based on the indication indicating that the rule modifies the critical functionality of the firewall.

17. The non-transitory computer-readable medium of claim 14, wherein the one or more instructions, that cause the one or more processors to process the request to configure the firewall with the rule, cause the one or more processors to:

configure the firewall with the rule based on the indication indicating that the rule does not modify the critical functionality of the firewall.

18. The non-transitory computer-readable medium of claim 14, wherein the one or more instructions, that cause the one or more processors to process the request to configure the firewall with the rule, cause the one or more processors to:

alter the rule to obtain an altered rule based on the indication indicating that the rule modifies the critical functionality of the firewall,
wherein the altered rule does not modify the critical functionality of the firewall; and configure the firewall with the altered rule.

19. The non-transitory computer-readable medium of claim 14, wherein the one or more instructions, when executed by the one or more processors, further cause the one or more processors to:

compare, using the process, the rule and the critical functionality of the firewall to determine whether the rule modifies the critical functionality of the firewall.

20. The non-transitory computer-readable medium of claim 14, wherein the definition is a first definition,
wherein the command has a second definition in a second library,
wherein the second definition prescribes that the one or more processors are to allow the application to configure the firewall with the rule, and
wherein the one or more instructions, that cause the one or more processors to intercept the request to configure the firewall with the rule, cause the one or more processors to:
replace the second definition with the first definition.

* * * * *